US012656740B2

(12) United States Patent
Joly

(10) Patent No.: US 12,656,740 B2
(45) Date of Patent: Jun. 16, 2026

(54) HOROLOGICAL MOVEMENT COMPRISING A CHRONOGRAPH MECHANISM, IN PARTICULAR A JUMPING-SECOND MECHANISM

(71) Applicant: BLANCPAIN SA, Le Brassus (CH)

(72) Inventor: Lilian Joly, Sirod (FR)

(73) Assignee: BLANCPAIN SA, Le Brassus (CH)

( * ) Notice: Subject to any disclaimer, the term of this patent is extended or adjusted under 35 U.S.C. 154(b) by 296 days.

(21) Appl. No.: 18/594,364

(22) Filed: Mar. 4, 2024

(65) Prior Publication Data

US 2024/0353800 A1 Oct. 24, 2024

(30) Foreign Application Priority Data

Apr. 18, 2023 (EP) .................................... 23168492

(51) Int. Cl.
*G04F 7/08* (2006.01)

(52) U.S. Cl.
CPC .......... *G04F 7/0876* (2013.01); *G04F 7/0809* (2013.01); *G04F 7/0861* (2013.01)

(58) Field of Classification Search
CPC .... G04F 7/0809; G04F 7/0861; G04F 7/0876; G04F 7/088; G04F 7/0804; G04F 7/0842
See application file for complete search history.

(56) References Cited

U.S. PATENT DOCUMENTS 161,813 A * 4/1875 Mott ................ G04B 19/24326 968/204
515,862 A * 3/1894 Eisen ..................... G04B 15/14 968/102
3,832,844 A * 9/1974 Matsumura .............. G04D 7/04 368/185
3,901,020 A * 8/1975 Capt ..................... G04F 7/0852 368/106

(Continued)

FOREIGN PATENT DOCUMENTS

CH 703797 B1 3/2012
EP 3059642 A1 8/2016

(Continued)

OTHER PUBLICATIONS

European Search Report of No. 23168492.9 dated Sep. 22, 2023.

*Primary Examiner* — Sean Kayes
(74) *Attorney, Agent, or Firm* — Sughrue Mion, PLLC

(57) ABSTRACT

A horological movement (1) including a running train (100) driven by a first power source (150) and regulated by a regulating member (120); a chronograph mechanism (10) including a chronograph train (20) driven by a second power source (35) including a chronograph counter (23) having a counter wheel (231); a chronograph start/stop control device (30) configured to couple on demand the chronograph train (20) to the regulating member (120); a reset mechanism (40) for resetting said chronograph counter (23), including a reset control (60) movable between a neutral rest position and a reset position; the chronograph mechanism (10) including a (Continued)

1 lever (70) configured to be controlled by the chronograph start/stop control device (30) between a first stable position wherein the lever (70) blocks the rotation of the counter wheel (231) and a second stable position, wherein the counter wheel (231) is free to rotate.

14 Claims, 5 Drawing Sheets

(56) References Cited

U.S. PATENT DOCUMENTS 5,113,382 A * 5/1992 Bron .................... G04F 7/0842 368/106
5,793,708 A * 8/1998 Schmidt ................ G04F 7/0814 368/110
6,975,561 B2 * 12/2005 Forsey .................. G04F 7/0842 368/110
7,614,782 B2 * 11/2009 Hiraya .................. G04F 7/0804 368/106
7,905,655 B2 * 3/2011 Jolidon ................. G04F 7/0809 368/106
8,328,414 B2 * 12/2012 Graemiger ........... G04B 27/065 368/190
8,434,934 B2 * 5/2013 Wyssbrod ............. G04F 7/0847 368/106
2004/0264303 A1 * 12/2004 Brida .................... G04F 7/0876 368/110
2005/0007888 A1 * 1/2005 Jolidon ................. G04F 7/0809 368/110

FOREIGN PATENT DOCUMENTS

JP 05-215868 A 8/1993
JP 2009-517644 A 4/2009

* cited by examiner

1

HOROLOGICAL MOVEMENT COMPRISING A CHRONOGRAPH MECHANISM, IN PARTICULAR A JUMPING-SECOND MECHANISM

CROSS REFERENCE TO RELATED APPLICATION

This application is claiming priority based on European Patent Application No. 23168492.9 filed on Apr. 18, 2023.

TECHNICAL FIELD OF THE INVENTION

The present invention relates to a horological movement including a chronograph mechanism.

This invention relates to a horological movement comprising a chronograph mechanism with a split-second counter.

More particularly, the invention relates to a chronograph mechanism comprising a mechanism for resetting a split-second counter.

The invention also relates to a timepiece comprising such a chronograph mechanism.

TECHNOLOGICAL BACKGROUND

Chronograph mechanisms allow time to be measured on demand by means of several chronograph counters, for example minutes and seconds counters.

Chronograph mechanisms conventionally comprise a reset mechanism for resetting the chronograph counters, that is to say repositioning them in a reference position so that time can be measured again on demand.

Conventionally, such a reset mechanism consists of a reset control that can be handled by the user, for example via a push-button or an actuating stud accessible from outside the middle part wherein the horological movement is mounted.

The reset control cooperates directly or indirectly with a reset hammer which strikes the reset cams carried by the various chronograph counters.

Some complex chronograph mechanisms can be equipped with an additional counter to display fractions of a second.

It is then necessary to reset the split-second counter.

One solution is to use an additional hammer to strike a reset cam carried by the split-second counter. However, such a solution makes the mechanism even more complex and increases the number of parts in the horological movement. In addition, the presence of a reset cam on the split-second counter generates an additional imbalance that must be managed, particularly when the chronograph is stopped, given the rapid rotation of the counter (1 revolution per second).

Another solution was proposed in document CH703797, which dispenses with the need for a reset cam on the split-second counter.

This solution consists of using a coupling-clutch kinematically connecting the escapement wheel to the axis of the jumping-second pinion. The coupling-clutch comprises: a first wheel with wolf-tooth integral with the escapement wheel; a first six-tooth star wheel driven onto the axis of the jumping-second pinion; a second six-tooth star wheel mounted freely on the axis of the jumping-second pinion and connected to the first star wheel by a pin driven into the first star wheel and passing through an oblong slot in the second star wheel.

However, this solution is complex to manufacture and install. In addition, given the configuration of such a system, the chronograph is not precise because it has a delay of one pitch of the escapement wheel corresponding to an alternation of the anchor. Finally, it is difficult to obtain precise positioning of the split-second display in the zero position, given the manufacturing tolerances.

Consequently, there is a need to improve chronograph mechanisms, and in particular chronograph mechanisms having a split-second counter, as well as to improve the counter reset mechanisms of such chronograph mechanisms.

SUMMARY OF THE INVENTION

In this context, one of the purposes of the invention is to propose a chronograph mechanism that solves at least one of the problems raised above.

One of the purposes of the invention is to provide a reset mechanism which offers precise resetting, in particular of a chronograph split-second hand, exactly opposite a predetermined graduation of the dial.

One of the purposes of the invention is to offer a reliable and secure reset mechanism that enables precise zero-setting and avoids the problem of unbalance on chronograph counters that rotate rapidly.

In this context, the invention relates to a horological movement comprising a running train dedicated to the division of time of said horological movement, said running train being driven by a first power source and regulated by a regulating member; the horological movement comprising a chronograph mechanism comprising:

- a chronograph train driven by a second power source; the chronograph train comprising a chronograph counter having a counter wheel and a display integral in rotation with the counter wheel;
- a chronograph start/stop control device configured to couple on demand the chronograph train to the regulating member, or to the running train, to regulate the chronograph train from the regulating member;
- a reset mechanism for resetting said chronograph counter, comprising a reset control movable between a neutral rest position and a reset position.

The chronograph mechanism according to the invention further comprising a lever, which is rotatable about an axis of rotation, configured to cooperate with the chronograph counter; said lever being configured to be controlled by the chronograph start/stop control device between a first stable position, referred to as the stop position, wherein the lever blocks the rotation and maintains the position of the counter wheel, and a second stable position, referred to as the neutral position, wherein the counter wheel is free to rotate; the reset control being configured to cooperate, in the reset position, with the lever to position the latter angularly in a third intermediate position wherein the lever partially releases the counter wheel so as to authorise rotation of the counter wheel until it is positioned in a reset reference position, the counter wheel being driven by the second power source driving the chronograph train.

In addition to the features mentioned in the preceding paragraph, the horological movement according to the invention may have one or more complementary features from the following, considered individually or in any technically possible combination:

- the counter wheel has a toothing comprising a long tooth having an end portion radially further from the centre of the counter wheel than the other teeth constituting the toothing; the lever being inserted between two consecutive teeth of the toothing of the counter wheel in said first stable position of the lever to block the rotation and maintain the position of the counter wheel, the lever interacting with the end portion of the long tooth in said third intermediate position to partially release the counter wheel and allow rotation of the counter wheel until the long tooth abuts against the lever positioning the counter wheel in a reset reference position;

the counter wheel has an asymmetrical or wolf toothing;

the lever comprises a first arm configured to sense different states of the chronograph start/stop control device, a second arm configured to cooperate with the counter wheel, and a third arm configured to cooperate with the reset control;

the third arm of the lever cooperates with a recess of the reset control, the recess having a profile configured to guide the lever into said third intermediate position when the reset control is in the reset position;

the chronograph mechanism comprises an elastic member configured to return the lever to its first stable position;

the chronograph start/stop control device comprises a column wheel configured to control the lever between its first stable position, known as the stop position, and its second stable position, known as the neutral position;

the counter is a split-second counter and the lever is a jumping lever;

the chronograph train comprises a seconds counter comprising a seconds display;

the reset mechanism comprises a seconds reset member integral with the seconds display and a reset hammer shaped to cooperate with the seconds reset member and to generate a driving torque under the action of the reset control until the seconds reset member is positioned in a reference position;

the chronograph train comprises a minutes counter comprising a minutes display;

the reset mechanism comprises a minutes reset member integral with the minute display, the reset hammer being shaped to cooperate with the minutes reset member and to generate a driving torque under the action of the reset control until the minutes reset member is positioned in a reference position;

the regulating element comprises a high-frequency oscillator having an oscillation frequency greater than or equal to 5 Hz.

Another aspect of the invention relates to a timepiece comprising such a horological movement according to the invention.

The timepiece is preferably a wristwatch comprising a watch case configured to receive and house the horological movement according to the invention.

BRIEF DESCRIPTION OF THE FIGURES

The purposes, advantages and features of the present invention will become apparent upon reading the detailed description below with reference to the following figures.

In all figures, common elements have the same reference numbers unless otherwise specified.

DETAILED DESCRIPTION OF THE INVENTION

Figure 1:
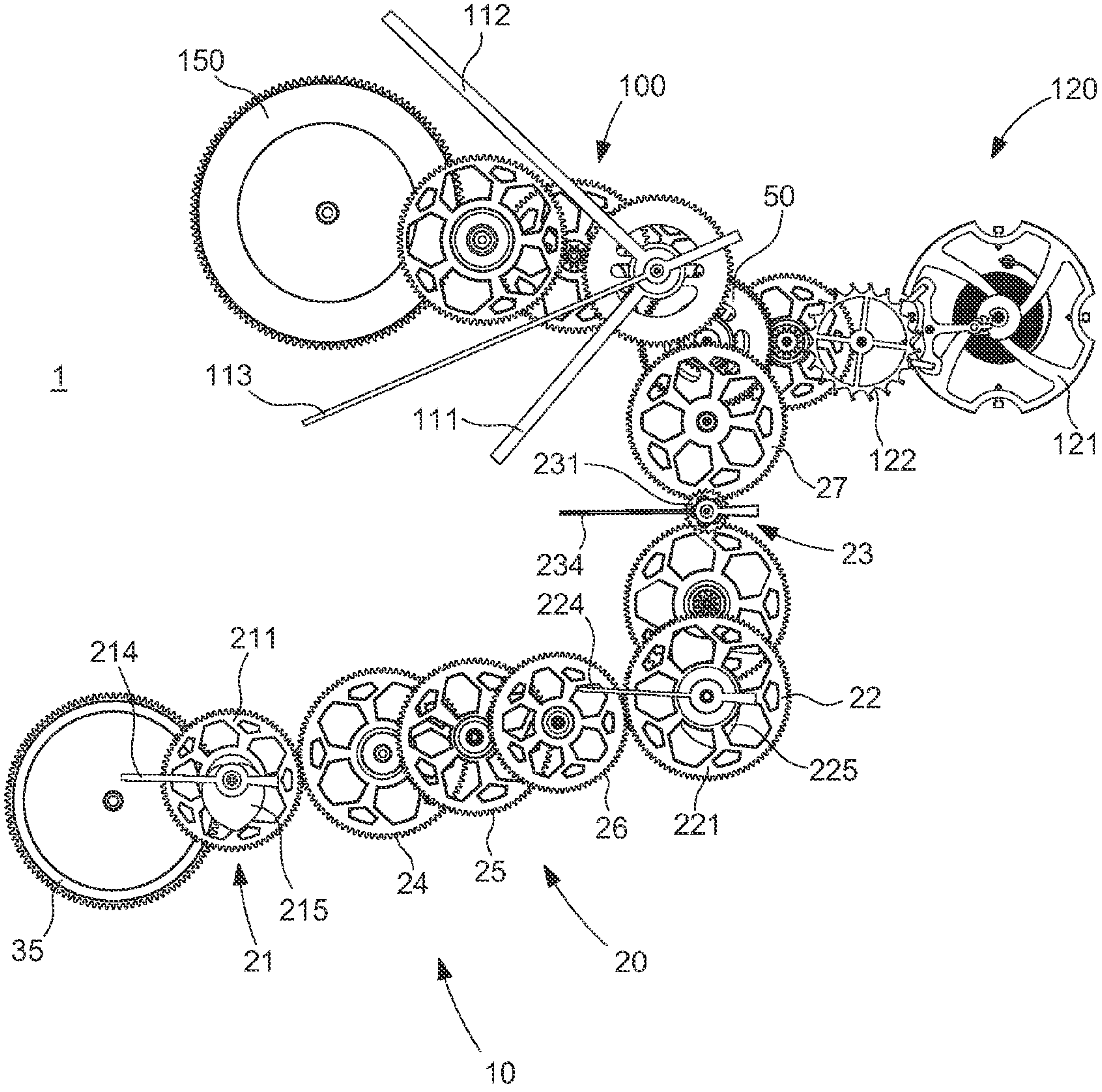
FIG. 1 schematically and functionally illustrates a horological movement 1 according to the invention.

FIG. 1 shows a schematic functional representation of a horological movement 1 according to the invention.

Figure 2:
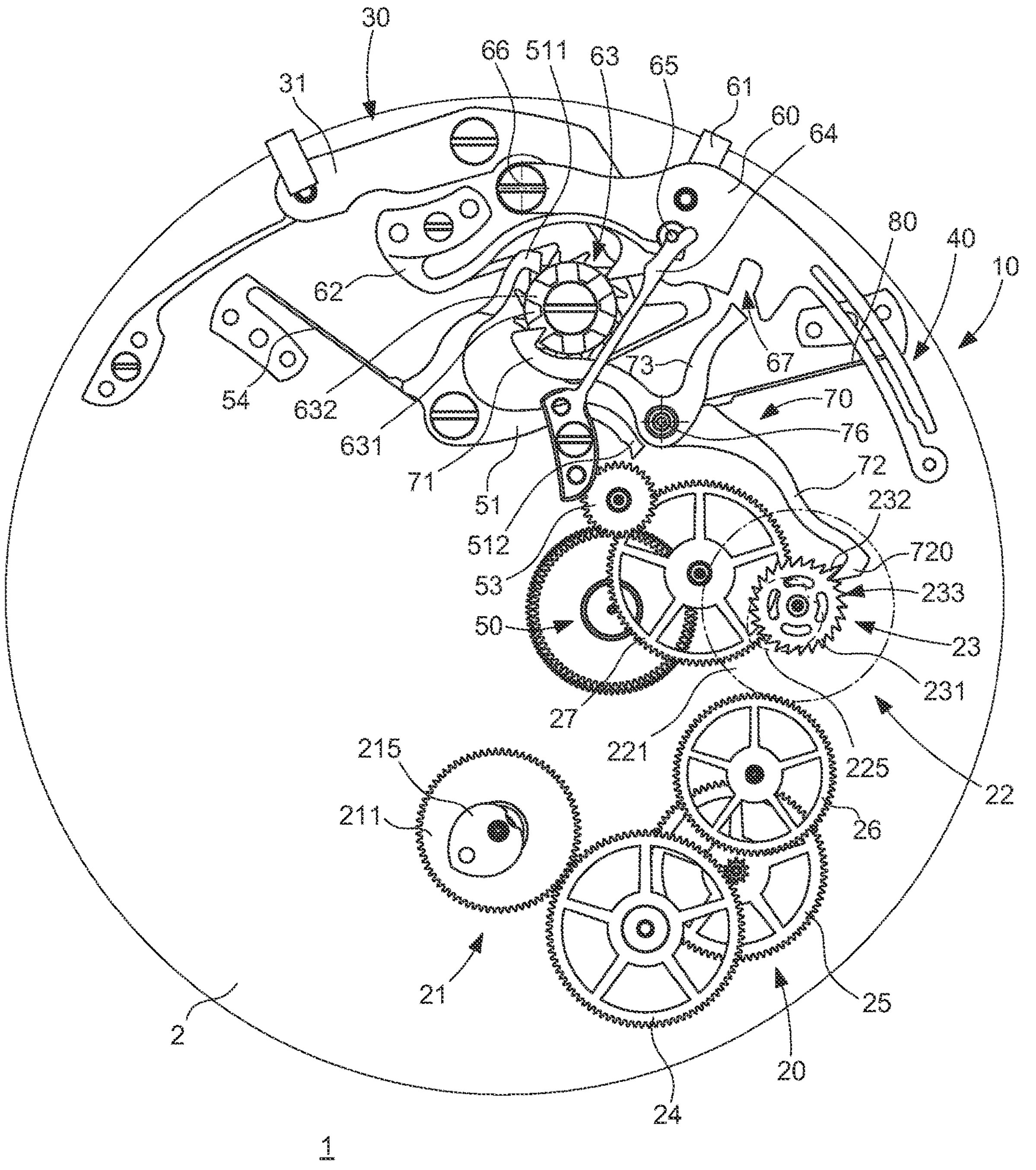
FIG. 2 is a schematic representation in plan view of the horological movement 1 according to the invention, comprising a chronograph mechanism in a stopped state prior to start-up.

FIG. 2 shows a schematic plan view of the horological movement 1 according to the invention, comprising a chronograph mechanism 10.

FIG. 2 shows the chronograph mechanism 10 in a neutral position, that is to say in a stopped state with the chronograph counters in their reference position before start-up of the chronograph mechanism.

Figure 3:
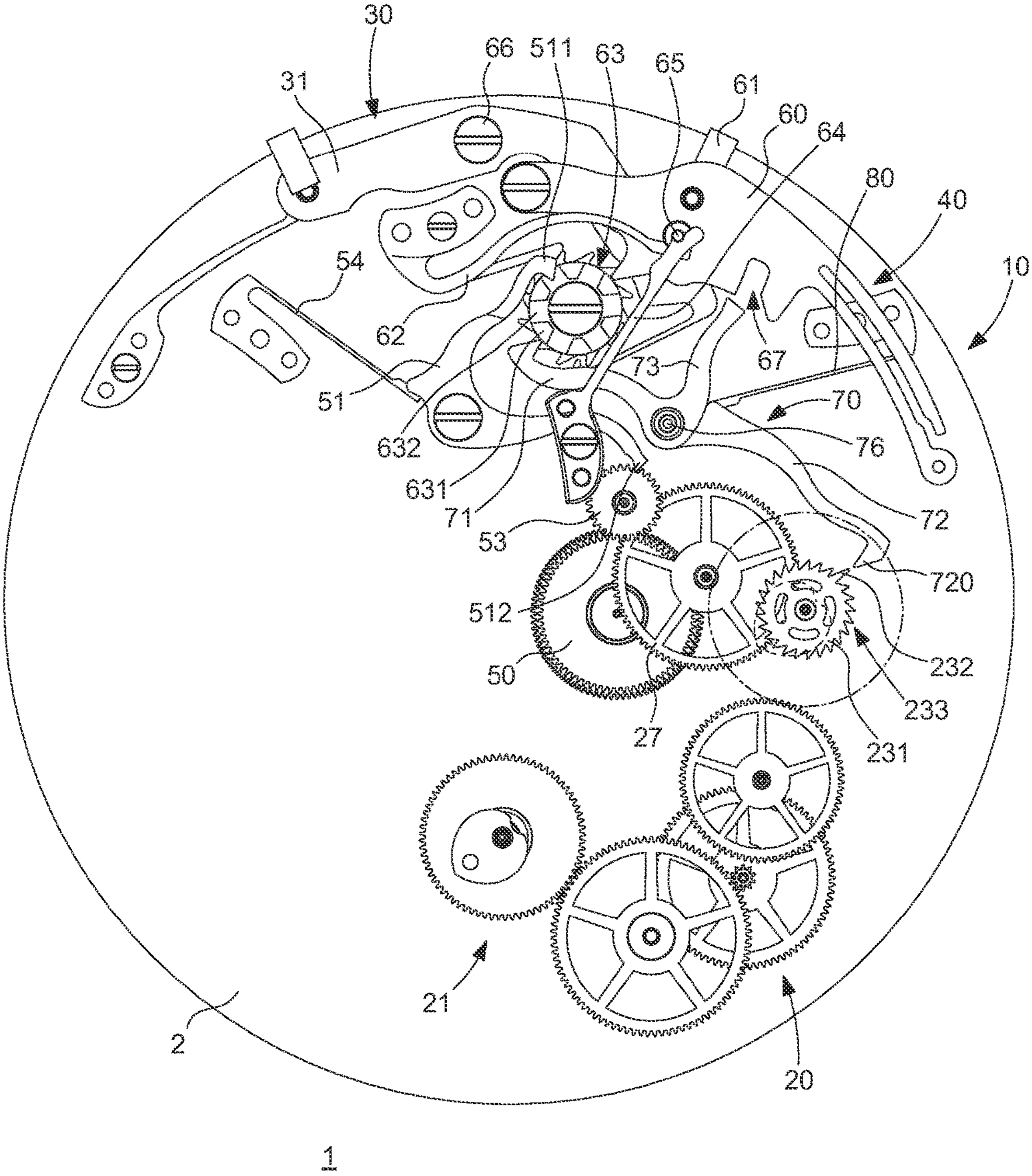
FIG. 3 illustrates the same horological movement according to the invention with the chronograph mechanism in a running state.

FIG. 3 shows the same horological movement 1 with the chronograph mechanism 10 in a running state of the chronograph train 20.

Figure 4:
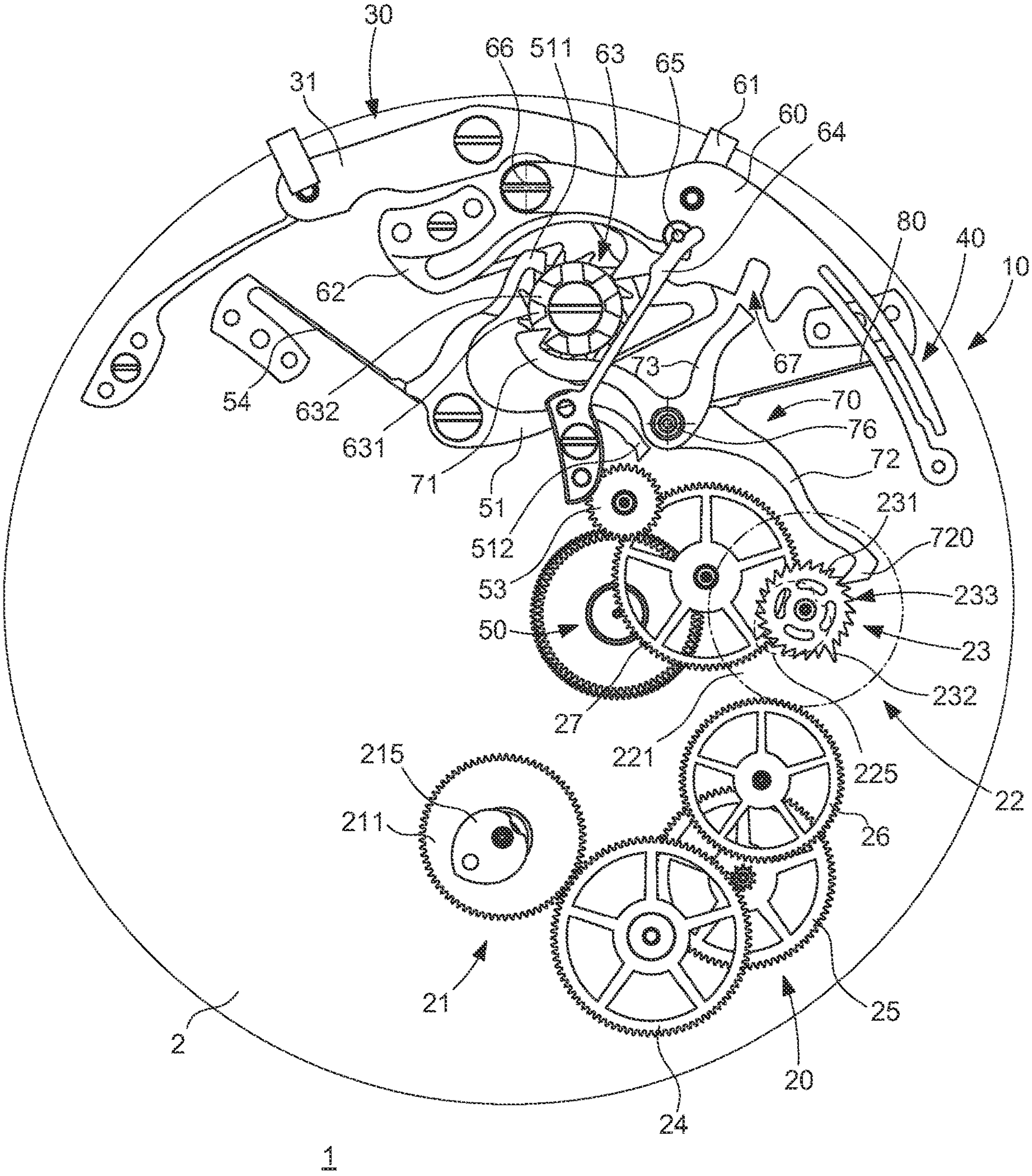
FIG. 4 illustrates the same horological movement according to the invention with the chronograph mechanism in a stopped state after start-up of the chronograph mechanism.

FIG. 4 illustrates the same horological movement 1 with the chronograph mechanism 10 in a stopped state of the chronograph train 20, after the chronograph mechanism 10 has been started.

Figure 5:
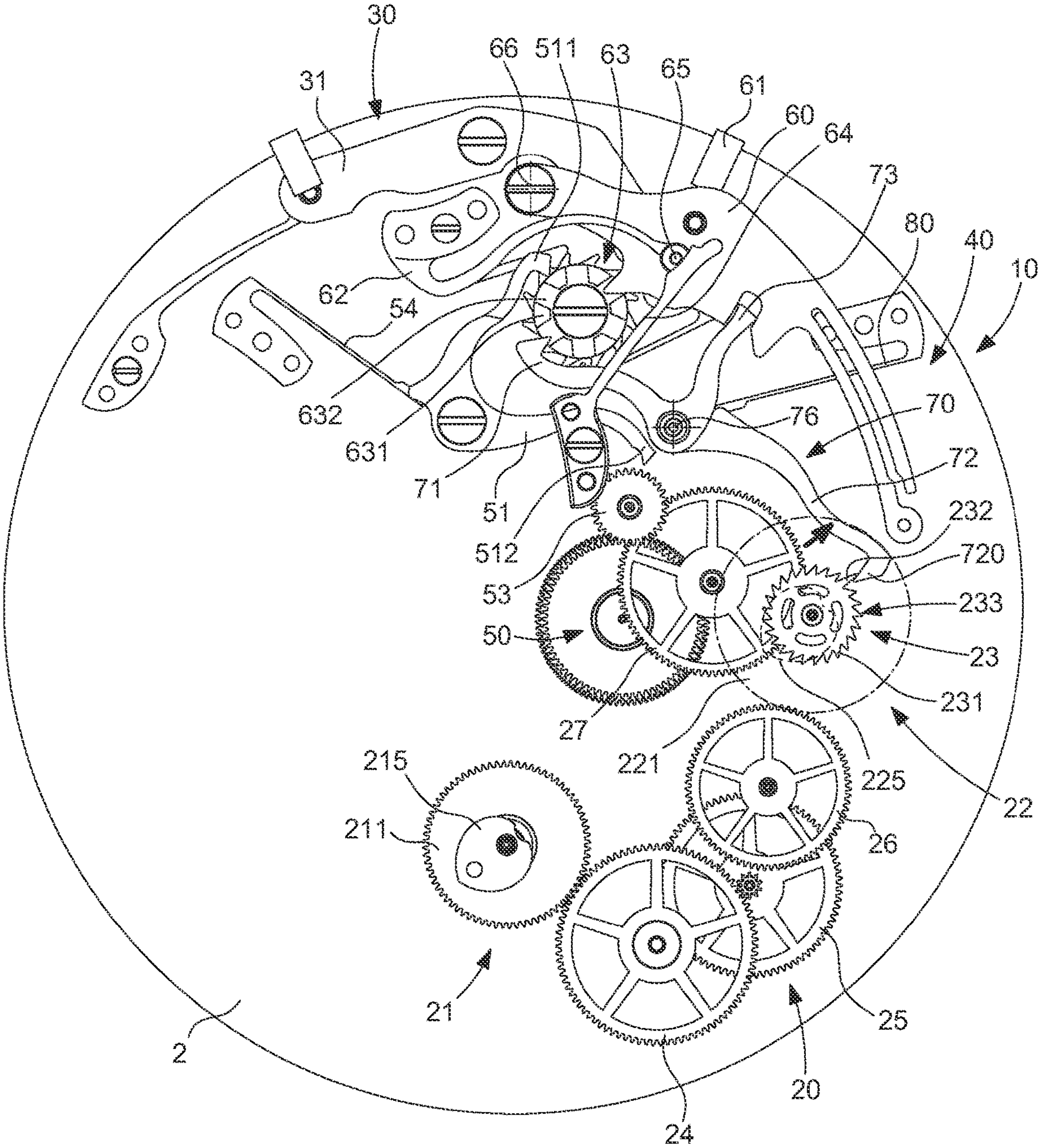
FIG. 5 illustrates the same horological movement according to the invention with the chronograph mechanism in a reset state when the reset control of the chronograph mechanism is pressed.

FIG. 5 illustrates the same horological movement 1 with the chronograph mechanism 10 in a state wherein the chronograph train 20 is reset when the chronograph mechanism reset control is pressed.

With reference to FIGS. 1 to 5, the horological movement 1 according to the invention conventionally comprises a plate 2 used as a support for the various elements of the horological movement 1, in particular a running train 100 dedicated to the division of time which is driven by a main power source 150.

The main power source 150 is, for example, a barrel constituting an energy reserve for power supplying the running train.

Conventionally, the running train 100 drives the displays of a time display, for example an hour hand 111 cooperating with an hour scale, a minute hand 112 cooperating with a minute scale and a second hand 113, cooperating with a second scale.

The running train 100 is conventionally controlled by a regulating member 120.

The regulating member 120 conventionally comprises an oscillator 121 and an escapement 122. The oscillator 121 may be a mechanical or electrical oscillator.

For example, the oscillator 121 is a mechanical oscillator of the balance-spring type. Such a balance-spring has, for example, an oscillation frequency comprised between 2.5 and 4 Hz.

For example, the oscillator 121 is a high-frequency mechanical or electrical oscillator, that is to say oscillating at a frequency greater than 4 Hz.

For example, the oscillator 121 is a high-frequency mechanical or electrical oscillator, that is to say oscillating at a frequency greater than or equal to 5 Hz.

The chronograph mechanism 10 comprises a chronograph train 20 which can be kinematically connected, and on demand, with the running train 100, by means of a coupling-clutch 50 controlled by a chronograph start/stop control device 30.

The chronograph start/stop control device 30 is configured to couple on demand the chronograph train 20 to the regulating member 120, or to the running train 100, to regulate the chronograph train 20 from the regulating member 120 of the horological movement 1.

The chronograph start/stop control device 30 comprises a start/stop control member 31 which can be handled by the user and a clutch lever 51 controlled by actuation of the start/stop control member 31.

The chronograph train 20 is driven by a dedicated secondary power source 35, different from the main power source 150 of the running train 100. In this way, the entire chronograph train 20 is power supplied by a secondary power source 35, independently of the main power source 150 actuating the running train 100.

The secondary power source 35 is, for example, a barrel constituting an energy reserve for power supplying the chronograph train 20.

The chronograph train 20 comprises at least one chronograph counter, preferably a split-second counter 23 or jumping counter, for displaying fractions of a second.

The chronograph train 20 may also comprise a second chronograph counter and possibly a third chronograph counter.

The second chronograph counter is, for example, a seconds counter 22, and the third chronograph counter is, for example, a minutes counter 21.

The chronograph train 20 can also comprise an hour counter without departing from the scope of the invention.

The split-second counter 23 comprises a counter wheel, referred to here as a jumping wheel 231, coupled to a split-second counter shaft, driving a split-second display 234, for example a hand, also referred to as a jumping hand.

The minute counter 21 comprises a minutes counter wheel 211 coupled to a minutes counter shaft, driving a chronograph minutes display 214, for example a hand as shown in FIG. 1.

The seconds counter 22 comprises a seconds counter wheel 221 coupled to a seconds counter shaft, driving a chronograph seconds display 224, for example a hand.

In the example shown in FIGS. 2 to 5, the seconds counter 22 is superimposed on the split-second counter 23, so that the split-second counter shaft coincides with the seconds counter shaft. For ease of reading, the seconds counter 22 is shown schematically as a dotted line so as not to obscure the split-second counter 23. Of course, another configuration is possible without departing from the context of the invention.

Conventionally, the minutes counter wheel 211 and the seconds counter wheel 221 are friction-mounted on their respective shafts.

The chronograph train 20 may comprise intermediate chronograph wheel sets 24, 25, 26 to obtain the desired ratios between the various counters 21, 22, 23 of the chronograph mechanism 10. The chronograph train 20 may comprise more intermediate wheel sets depending on the needs and architectures of the horological movement 1, as well as the positioning of the different chronograph counters on the plate 2.

In the example shown, the coupling-clutch 50 is a differential clutch cooperating with the clutch lever 51, the clutch lever allowing to block one of the inputs of the differential clutch on demand according to the running or stopped state of the chronograph.

In the example shown, the clutch lever 51 is configured to block one of the inputs of the differential clutch 50 via an intermediate clutch wheel 53 meshed with the differential clutch 50.

Alternatively, the clutch can be a lever clutch allowing pivoting of an intermediate clutch wheel 53.

According to a variant embodiment, the coupling-clutch is a vertical clutch.

In this way, the coupling-clutch 50 allows:

- Coupling the chronograph train 20 to the running train 100 and/or to the regulating member 120 of the horological movement 1 in order to start the various chronograph counters 21, 22, 23 and regulate them in time with the regulating member 120;
- decoupling the chronograph train 20 from the running train 100 and/or from the regulating member 120 of the horological movement 1 in order to stop the chronograph train 20 and the various displays 214, 224, 234 of the chronograph counters 21, 22, 23.

Conventionally, the differential clutch 50 comprises:

- a first input wheel driven by the running train and therefore having a speed of rotation regulated by the regulating member;
- an output wheel meshed with said chronograph train 20, here with an intermediate wheel 27 meshed with the split-second counter 23;
- a second loose input wheel cooperating directly or indirectly with the intermediate clutch wheel 53, which can be rotationally blocked by the clutch lever 51 controlled by the chronograph start/stop control member 30.

The coupling-clutch 50 also comprises a drive assembly configured to rotate the output wheel at said speed of rotation of the first input wheel, when the second input wheel is rotationally blocked via the clutch lever 51.

Preferably, the coupling-clutch 50 is a ball differential clutch. Thus, the drive assembly is formed by the cooperation of balls and an elastic element, formed by a spring washer, ensuring that the balls roll without slipping on the first input wheel and the output wheel.

The chronograph start/stop control device 30 comprises a column wheel 63 for controlling the various levers according to the running or stopped state of the chronograph.

In the illustrated example, the chronograph start/stop control member 31 is configured to move the column wheel 63 each time it is activated by the user, so that each activation of the chronograph start/stop control member 31 causes the column wheel 63 to rotate by one pitch. Conventionally, the different angular positions of the column wheel 63 allow the movements of the different rockers, levers, etc. of the chronograph mechanism 10 to be coordinated for starting and stopping the chronograph train 20 and for authorising the resetting of the different displays 214, 224, 234 of the counters 21, 22, 23 of the chronograph mechanism 10.

The different angular positions of the column wheel 63 allow to control the clutch lever 51 between a non-activated position wherein the clutch lever 51 is not in contact with the intermediate clutch wheel 53 and an activated position wherein the clutch lever 51 rotationally blocks the intermediate clutch wheel 53, and therefore the second loose input wheel of the coupling-clutch 50.

The clutch lever 51 comprises a first end 511 configured to cooperate with the column wheel 63, and particularly to sense the position of the column wheel 63 by sensing the present of a column 631 or an inter-column space 632 of the column wheel 63, and a second, beak-shaped, end 512 configured to cooperate with the toothing of the intermediate clutch wheel 53 according to the position of the first end 511 on a column 631 or in an inter-column space 632.

In this way, the clutch lever 51 switches between the non-activated position (shown in FIG. 1) wherein the first end 511 is in contact with a column 631 and the second end 512 at a distance from the intermediate clutch wheel 53, and the activated position (shown in FIG. 2) wherein the first end 511 of the clutch lever 51 is housed in an inter-column space 632 and the second end 512 is inserted between two consecutive teeth of the intermediate clutch wheel 53, to block the rotation of the intermediate clutch wheel 53 engaged with the coupling-clutch 50.

The clutch lever 51 cooperates with an elastic member 54 configured to ensure contact of the first end 511 of the clutch lever 51 with the column wheel 63.

As the operation of a chronograph mechanism 10 with such a column wheel 63 is well known, it is not necessary to further explain the operation of such a wheel.

The chronograph mechanism 10 comprises a reset mechanism 40 of the counters 21, 22, 23 of the chronograph train 20, and more particularly the displays 214, 224, 234 associated respectively with these counters 21, 22, 23.

The reset mechanism 40 comprises reset members 215, 225 integral with the shafts of the chronograph counters 21, 22. The reset members 215, 225 typically cooperate with one or more hammers (not shown) allowing them to be positioned in a reference position and the displays 214, 224 of the counters 21, 22 to be reset.

The reset members 215, 225 of the minutes 21 and seconds 22 counters are, for example, reset cams in the shape of a snail, heart or other shape, the shape of which allows the displays 214, 224 to be repositioned in a reference position at the end of the stroke of the hammer(s).

The reset mechanism 40 comprises a reset control 60 which can be handled by the user, for example via a push-button or an actuating pin 61. The reset control 60 can be rotated about an axis of rotation 66 between a neutral rest position and a reset position allowing the displays 214, 224, 234 to be reset.

The reset control 60 cooperates directly or indirectly with the reset hammer(s) to allow the displays 214, 224 of the associated counters 21, 22 to be reset.

The reset control 60 cooperates directly or indirectly with a jumping lever 70 to reset the split-second display 234 of the split-second counter 23.

Conventionally, the reset control 60 can only be actuated by the user when the chronograph is stopped, that is to say when the chronograph train 20 is stopped and the column wheel 63 is in a certain angular position allowing the reset control 60 to be switched.

The reset control 60 cooperates with an elastic reset element 62 configured to reposition the reset control 60 to the neutral rest position between each user activation. The repositioning of the reset control 60, under the elastic effect of the elastic reset element 62, causes the hammer(s) to be repositioned to their neutral position.

The chronograph mechanism 10 comprises a jumping lever 70 configured to interact with the split-second counter 23.

The reset control 60 cooperates directly or indirectly with a jumping lever 70 to reset the split-second display 234 of the split-second counter 23.

The jumping lever 70 is configured to cooperate with the start/stop control device 30 so as to control the angular position of the jumping lever 70 according to the start or stop of the chronograph train 20 and therefore of the start or stop of the split-second counter 23.

The jumping lever 70 is also configured to cooperate with the reset control 60 to allow the split-second counter 23, and more particularly the split-second display 234, to be reset when the reset control 60 is actuated.

The jumping lever 70 thus has a dual function. A first function is to hold the split-second display 234 in position when the chronograph is stopped and a second function is to ensure that the split-second display 234 is repositioned to the reference position when the chronograph is reset by actuating the reset control 60.

The jumping lever 70 can be rotated about an axis of rotation 76. The position of the axis of rotation 76 can be adjusted by means of an eccentric.

The chronograph mechanism 10 is configured to angularly position the jumping lever 70 in three positions ensuring three different actions. These three positions will be described in more detail below.

The jumping lever 70 comprises a first arm 71 configured to cooperate with the chronograph start/stop control device 30 and to sense the various states of the start/stop control device 30.

More particularly, the first arm 71 has a free end forming a sensor cooperating with the column wheel 63 of the chronograph start/stop control device 30 to position the jumping lever 70 in two stable positions which form two of the three positions of the jumping lever 70.

In a first angular position of the column wheel 63, the sensor of the first arm 71 is positioned in an inter-column space 632 of the column wheel 63, as seen in FIGS. 1, 3 and 4, when the chronograph train 20 is stopped. This position defines the first stable position of the jumping lever 70 which occurs at the same time as the stop of the chronograph mechanism 10.

In a second angular position of the column wheel 63, the sensor of the first arm 71 is in contact with a column 631, as shown in FIG. 2. This second position defines a second stable position of the jumping lever 70, which occurs at the same time as the start-up of chronograph train 20 and coupled to the running train 100.

The jumping lever 70 comprises a second arm 72, extending substantially opposite the first arm 71 relative to the axis of rotation 76. The second arm 72 comprises an end beak 720 configured to cooperate with and block the rotation of the split-second counter 23, and more particularly the jumping wheel 231 of the split-second counter 23.

In the first stable position of the jumping lever 70, known as the stop position, illustrated in FIGS. 1 and 3, the jumping wheel 231 is rotationally blocked by the end beak 720 of the second arm 72 of the jumping lever 70, which is inserted between two consecutive teeth of the toothing 233 of the jumping wheel 231.

In the second stable position of the jumping lever 70, known as the neutral position, as illustrated in FIG. 2, the jumping wheel 231 is free and can be rotated by the chronograph train 20 so as to count the fractions of a second.

The change in position, between the stop and neutral positions, of the jumping lever 70 is controlled by the column wheel 63, which is in turn rotated each time the chronograph start/stop control member 31 is activated.

Preferably, the jumping wheel 231 has an asymmetrical toothing 233, also known as wolf toothing.

The toothing of the jumping wheel 231 is composed of a series of identical teeth forming a regular toothing and a long tooth 232, that is to say having a greater height than the other teeth of the toothing 233. In other words, the long tooth 232 extends radially beyond the regular toothing of the jumping wheel 231.

The jumping lever 70 comprises a third arm 73 configured to directly or indirectly cooperate with the reset control 60 and to position the jumping lever 70 in a third position, said intermediate position, illustrated more particularly in FIG. 4.

This third intermediate position of the jumping lever 70 is not a stable position but a position imposed by the angular position of the reset control 60 when it is held partially or fully pressed by the user in the reset position.

This third arm 73 is used as a lever by the reset control 60 to position the jumping lever 70 in the intermediate position located angularly between the stop position and the neutral position. This intermediate position can only be reached from the stable stop position of the jumping lever 70, which blocks the jumping counter 23 in position when the chronograph is stopped.

In this intermediate position of the jumping lever 70, the end beak 720 is radially further from the centre of rotation of the jumping wheel 231 than in the stop position of the jumping lever 70.

In this intermediate position of the jumping lever 70, the end beak 720 is therefore clear of the regular toothing of the jumping wheel 231, allowing rotation of the jumping wheel 231, but is in a position close enough to the periphery of the jumping wheel 231 to be in the path of the long tooth 232 and thus able to interact with the long tooth 232 to block the rotation of the jumping wheel 231 in a particular position, the reference position. Thus, in this intermediate position of the jumping lever 70, the end beak 720 allows partial rotation of the jumping wheel 231, that is to say less than a full revolution, until the jumping wheel 231 is in the reference position.

More particularly, in this intermediate position of the jumping lever 70, the end beak 720 of the jumping lever 70 constitutes a positioning stop preventing the long tooth 232 from passing beyond the end beak 720 during rotation of the jumping wheel 231. When the long tooth 232 is in contact with the end beak 720, the jumping wheel 231 is held in its reference position which corresponds to the zero position of the split-second display 234.

To place the jumping lever 70 in the intermediate position, the reset control 60 has means configured to cooperate with the jumping lever 70, and more particularly with the third arm 73.

In the illustrated example, the reset control 60 comprises a recess 67 configured to receive, guide and house part of the third arm 73 and to act thereon. Contacting the reset control 60 with the third arm 73 is accompanied by rotation of the jumping lever 70 towards its neutral position so as to move the end beak 720 away from the regular toothing of the jumping wheel 231 and from the centre of rotation of the jumping wheel 231, as previously indicated.

The jumping lever 70 cooperates with an elastic jumping member 80 configured to return the jumping lever 70 to its stop position.

When the reset control 60 is released, the elastic jumping member 80 tends to position the end beak 720 in its stop position, that is to say inserted between two consecutive teeth of the toothing 233, to keep the jumping wheel 231 in position until the next start-up of the chronograph mechanism 10.

The reset mechanism 40 also comprises a retaining member 64 to secure the reset mechanism 40 and ensure that the hammer(s) are fully activated until they reach their reset position. The retaining member 64 is configured to momentarily hold back the activation of the reset control 60, and therefore of the hammer(s), until a certain force is applied to the reset control 60.

The retaining member 64 is a security member preventing unwanted resetting of the various displays 214, 224, 234 of the counters 21, 22, 23 of the chronograph mechanism 10. The dynamic behaviour of the retaining member 64 is similar to that of a mechanical fuse.

The retaining member 64 comprises a portion integral with the plate 2 and an elastic portion designed to exert the retaining force against actuation of the reset control 60. The elastic portion is configured to deform when a force greater than the retaining force is applied to the reset control 60, thereby releasing the full movement of the reset control 60 and allowing the hammer to move to its reset position (FIG. 4). The reset control 60 comprises, for example, a stud 65 designed to bear on the elastic portion of the retaining member 64.

More particularly, the stud 65 rests against a retaining notch formed at the free end of the elastic portion of the retaining member 64. The retaining notch has a retaining surface and a switching point beyond which the retaining member 64 allows the reset control 60 to be activated quickly and forcefully, thus allowing the hammer(s) to be fully actuated until the hammer(s) contact the reset cams 215, 225 of the chronograph counters 21, 22 and these cams are repositioned in their reference position.

The release of the reset control 60 also activates the jumping lever 70 generating a slight rotation towards its neutral position, which slightly moves the end tip 720 of the second arm 72 away from the regular toothing of the jumping wheel 231. The released jumping wheel 231 continues to rotate in the direction of travel, consuming energy from the energy reserve.

Advantageously, the jumping lever 70, particularly the third arm 73, and the reset control 60 are first configured so as to actuate the jumping lever 70 before the hammer(s) contact the reset cams 215, 225 of the counters 21, 22, so as to ensure a complete reset of the split-second display 234 before the complete reset of the seconds 224 and minute 214 displays via the hammer(s).

Operation of the Chronograph Mechanism of the Horological Movement

When the chronograph start/stop control member 31 is activated for the first time, the chronograph train 20 of the chronograph mechanism 10 is started as follows.

From the neutral position of the horological movement 1 illustrated in FIG. 1, activation of the chronograph start/stop control member 31 causes it to pivot about its axis of rotation, causing the column wheel 63 to rotate by one pitch, in this case in the counter-clockwise direction, thus modifying the arrangement of the inter-column spaces 632 and the columns 631 of the column wheel 63 relative to the various levers of the chronograph mechanism 10.

When the column wheel 63 rotates, the clutch lever 51 switches from its non-activated position (shown in FIG. 1) to its activated position (shown in FIG. 2) so as to block the rotation of the intermediate clutch wheel 53, causing the second loose input wheel of the coupling-clutch 50 to be blocked.

Blocking the second loose input wheel of the coupling-clutch 50 allows the chronograph train 20 to be coupled to the running train 100 of the horological movement 1, moving the chronograph train in time with the regulating member 120.

Simultaneously with the switching of the clutch lever 51, the rotation of the column wheel 63 causes the jumping lever 70 to be switched from its first stable position (stop position) (shown in FIG. 1), wherein the sensor of the first arm 71 is in an inter-column space 632 of the column wheel 63 and the end beak 720 of the second arm 72 is inserted between two consecutive teeth of the toothing 233 of the jumping wheel 231, to its second stable position (neutral position) (shown in FIG. 2), wherein the sensor of the first arm 71 is in contact with a column 631 of the column wheel 63, releasing the end beak 720 of the second arm 72, to its second stable position (neutral position) (illustrated in FIG. 2) wherein the sensor of the first arm 71 is in contact with a column 631 of the column wheel 63 releasing the end beak 720 from the toothing 233 of the jumping wheel 231.

In this way, the various counters 21, 22, 23 of the chronograph train 20 are free and rotated in time with the regulating member of the horological movement 1 via the coupling to the running train 100.

When the user wishes to stop the chronograph mechanism 10, he activates the chronograph start/stop control member 31 a second time, which pivots once again about its axis of rotation, causing the column wheel 63 to rotate by an additional pitch. In this new position of the column wheel 63 illustrated in FIG. 3, the first end 511 of the clutch lever 51 passes over a column 631 again, causing the clutch lever 51 to switch into its non-activated position. The second loose input wheel of the clutch 50 is thus released, which uncouples the chronograph train 20 from the running train 100, stopping the chronograph train 20.

The sensor of the first arm 71 of the jumping lever 70 passes into an inter-column space 632 of the column wheel 63, positioning the jumping lever 70 in its first stable position (stop position) under the effect of the elastic jumping member 80, wherein the end beak 720 is inserted between two consecutive teeth of the toothing 233 of the jumping wheel 231, thus blocking the position of the split-second display 234.

This stopped state of the chronograph is particularly illustrated in FIG. 3.

Additional conventional means (not shown) may also be provided to keep the displays 214, 224 of the various counters 21, 22 of the chronograph mechanism 10 in position in this chronograph stopped state. Such means may be controlled by the column wheel 63 by means of additional levers interacting with the various columns 631 and inter-column spaces 632.

From this stopped state of the chronograph mechanism 10, the user can restart the chronograph by pressing the chronograph start/stop control member 31 a third time, again starting the chronograph train 20 as described above with the corresponding pivoting of the levers.

From this same stopped state of the chronograph mechanism 10, the user can also reset the various counters 21, 22, 23 of the chronograph train 20 by activating the reset control 60, this reset being enabled by the position of the column wheel 63.

When a force greater than the retaining force generated by the retaining member 64 is applied to the reset control 60, the complete movement of the reset control 60 allows both to modify the position of the jumping lever 70 so as to position it in its third intermediate position allowing the reset of the split-second display 234, the jumping wheel 231 performing a rotation driven by the second power source 35 of the chronograph train 20 until the long tooth 232 contacts the end beak 720 of the second arm 72 of the jumping lever 70.

Simultaneously, the complete movement of the reset control 60 drives the hammer(s) of the chronograph mechanism 10, which strike the various reset members 215, 225 to return the various corresponding displays 214, 224 of the chronograph mechanism 10 to the reference position.

Complementarily, the actuation of the reset control 60 can release the means for holding the displays 214, 224 of the counters 21, 22 in position.

When the reset control 60 is released, it returns to the neutral position under the effect of the elastic member 62, returning the hammer(s) to the neutral position, optionally repositioning the means for holding the displays 214, 224 of the counters 21, 22 in position to ensure that these displays 214, 224 are held in position, releases its constraint exerted on the jumping lever 70 which, under the action of the elastic jumping member 80, repositions the end beak 720 between two consecutive teeth of the toothing 233 of the jumping wheel 231 to ensure that the jumping wheel 231 is held in position and thus avoid undesirable effects of fluctuation of the split-second display 234 while awaiting the next start-up of the chronograph mechanism 10.

As shown in FIGS. 2 to 5, the chronograph mechanism 10 was shown and described with a column wheel 63 to control the different movements of the different levers which are pressed against one column or between two columns. Of course, the chronograph mechanism 10 can also be a chronograph mechanism with cams replacing the column wheel 63 without departing from the context of the invention, to control the different states of the chronograph.

The invention was described in particular with a split-second counter. However, the invention can also be applied to a seconds, minutes or hours counter without departing from the scope of the invention.

The invention also relates to a timepiece, for example a wristwatch, comprising such a horological movement.

The invention claimed is:

1. A horological movement (1) comprising a running train (100) dedicated to the division of time of said horological movement (1), said running train (100) being driven by a first power source (150) and regulated by a regulating member (120); the horological movement (1) comprising a chronograph mechanism (10) comprising:

a chronograph train (20) driven by a second power source (35); the chronograph train (20) comprising a chronograph counter (23) having a counter wheel (231) and a display (234) integral in rotation with the counter wheel (231);

a chronograph start/stop control device (30) configured to couple on demand the chronograph train (20) to the regulating member (120), or to the running train (100), to regulate the chronograph train (20) from the regulating member (120);

a reset mechanism (40) for resetting said chronograph counter (23), comprising a reset control (60) movable between a neutral rest position and a reset position;

wherein the chronograph mechanism (10) comprises a lever (70), which is rotatable about an axis of rotation (76), configured to cooperate with the chronograph counter (23); said lever (70) being configured to be controlled by the chronograph start/stop control device (30) between a first stable position, referred to as the stop position, wherein the lever (70) blocks the rotation and maintains the position of the counter wheel (231), and a second stable position, referred to as the neutral position, wherein the counter wheel (231) is free to rotate; the reset control (60) being configured to cooperate, in the reset position, with the lever (70) to position the latter angularly in a third intermediate position wherein the lever (70) partially releases the counter wheel (231) so as to authorise rotation of the counter wheel (231) until it is positioned in a reset reference position, the counter wheel (231) being driven by the second power source driving the chronograph train.

2. The horological movement (1) according to claim 1, wherein the counter wheel (231) has a toothing (233) comprising a long tooth (232) having an end portion radially further from the centre of the counter wheel (231) than the other teeth constituting the toothing (233); the lever (70) being inserted between two consecutive teeth of the toothing (233) of the counter wheel (231) in said first stable position of the lever (70) to block the rotation and maintain the position of the counter wheel (231), the lever (70) interacting with the end portion of the long tooth (232) in said third intermediate position to partially release the counter wheel (231) and allow partial rotation of the counter wheel (231) until the long tooth (232) abuts against the lever (70) positioning the counter wheel in a reset reference position.

3. The horological movement (1) according to claim 1, wherein the counter wheel (231) has an asymmetrical toothing.

4. The horological movement (1) according to claim 1, wherein the lever (70) comprises a first arm (71) configured to sense different states of the chronograph start/stop control device (30), a second arm (72) configured to cooperate with the counter wheel (231), and a third arm (73) configured to cooperate with the reset control (60).

5. The horological movement (1) according to claim 4, wherein the third arm (73) of the lever (70) cooperates with a recess (67) of the reset control (60), the recess (67) having a profile configured to guide the lever (70) into said third intermediate position when the reset control (60) is in the reset position.

6. The horological movement (1) according to claim 1, wherein the chronograph mechanism (10) comprises an elastic member (80) configured to return the lever (70) to its first stable position.

7. The horological movement (1) according to claim 1, wherein the chronograph start/stop control device (30) comprises a column wheel (63) configured to control the lever (70) between its first stable position, known as the stop position, and its second stable position, known as the neutral position.

8. The horological movement (1) according to claim 1, wherein the counter (23) is a split-second counter and the lever (70) is a jumping lever.

9. The horological movement (1) according to claim 1, wherein the chronograph train (20) comprises a seconds counter (22) comprising a seconds display (224).

10. The horological movement (1) according to claim 9, wherein the reset mechanism (40) comprises a seconds reset member (225) integral with the seconds display (224) and a reset hammer shaped to cooperate with the seconds reset member (225) and to generate a motor torque under the action of the reset control (60) until the seconds reset member (225) is positioned in a reference position.

11. The horological movement (1) according to claim 1, wherein the chronograph train (20) comprises a minute counter (22) comprising a minute display (224).

12. The horological movement (1) according to claim 11, wherein the reset mechanism (40) comprises a minute reset member (215) integral with the minute display (214), the reset hammer being shaped to cooperate with the minute reset member (215) and to generate a motor torque under the action of the reset control (60) until the minute reset member (215) is positioned in a reference position.

13. The horological movement (1) according to claim 12, wherein the regulating member (120) comprises a high-frequency oscillator (121) having an oscillation frequency greater than or equal to 5 Hz.

14. A timepiece comprising the horological movement (1) according to claim 1.

* * * * *